United States Patent
Cromer et al.

(10) Patent No.: US 6,237,100 B1
(45) Date of Patent: May 22, 2001

(54) POWER PASSWORDS WITHIN A DATA PROCESSING SYSTEM FOR CONTROLLING A SUPPLY OF SYSTEM POWER

(75) Inventors: Daryl Carvis Cromer, Cary; Brandon Jon Ellison, Raleigh; Eric Richard Kern, Durham; Joseph Wayne Freeman, Raleigh; Randall Scott Springfield, Chapel Hill, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/204,655

(22) Filed: Dec. 2, 1998

(51) Int. Cl.[7] .............................. G06F 1/26; G06F 11/30
(52) U.S. Cl. .......................................... 713/300; 713/202
(58) Field of Search .................................... 713/200–202, 713/300–310

(56) References Cited

U.S. PATENT DOCUMENTS

| | | | |
|---|---|---|---|
| 4,959,860 | * | 9/1990 | Watters et al. ............................. 380/4 |
| 5,191,323 | * | 3/1993 | Abbes et al. ...................... 340/825.37 |
| 5,265,163 | * | 11/1993 | Golding et al. ......................... 380/25 |
| 5,313,639 | * | 5/1994 | Chao ..................................... 713/202 |
| 5,388,156 | * | 2/1995 | Blackledge, Jr. et al. ............... 380/4 |
| 5,446,906 | | 8/1995 | Kardach et al. . |
| 5,465,083 | * | 11/1995 | Okamoto .......................... 340/825.31 |
| 5,485,622 | * | 1/1996 | Yamaki ................................. 713/200 |
| 5,537,544 | * | 7/1996 | Morisawa et al. .................... 713/202 |
| 5,552,776 | * | 9/1996 | Wade et al. ....................... 340/825.31 |
| 5,555,373 | * | 9/1996 | Dayan et al. .......................... 713/202 |
| 5,574,786 | * | 11/1996 | Dayan et al. .............................. 380/4 |
| 5,629,694 | | 5/1997 | Simon et al. . |
| 5,724,027 | | 3/1998 | Shipman et al. . |
| 5,751,950 | * | 5/1998 | Crisan .................................. 713/202 |
| 5,832,214 | * | 11/1998 | Kikinis ................................. 713/202 |
| 5,887,131 | * | 3/1999 | Angelo ................................. 713/202 |
| 5,960,084 | * | 9/1999 | Angelo .................................. 380/25 |
| 5,978,919 | * | 11/1999 | Doi et al. ............................. 713/202 |
| 6,041,413 | * | 3/2000 | Wang .................................. 713/202 |

FOREIGN PATENT DOCUMENTS

| | | | | |
|---|---|---|---|---|
| 3835624A1 | * | 4/1990 | (DE) | ................................ G06F/3/02 |
| 02062614 | * | 3/1990 | (JP) | ................................ G06F/1/00 |

OTHER PUBLICATIONS

IBM Research Disclosure 41991, Power Up Security for External Device Bay, Mar. 1999, p. 392.*

* cited by examiner

Primary Examiner—Sumati Lefkowitz
(74) Attorney, Agent, or Firm—Bernard D. Bogdon; Felsman Bradley Vaden Gunter & Dillon, LLP

(57) ABSTRACT

A data processing system and method are described for controlling power supplied to the system. The system includes an internal power supply for receiving energy from an external source and supplying the energy to the system. The energy is full system power and is required for the system to be fully operable. The system is initially powered-off such that the energy is not initially supplied to the system. A power-on password is established. The internal power supply supplies the energy to the system only in response to a correct entry of the power-on password, wherein the system is inoperable prior to the correct entry of the power-on password.

8 Claims, 3 Drawing Sheets

POWER PASSWORDS WITHIN A DATA PROCESSING SYSTEM FOR CONTROLLING A SUPPLY OF SYSTEM POWER

BACKGROUND OF THE INVENTION

1. Field of the Invention

The present invention relates in general to data processing systems and, in particular, to a data processing system and method for controlling a supply of system power. Still more particularly, the present invention relates to a data processing system and method for controlling a supply of system power utilizing power passwords.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional SCSI adapter. One of the distinguishing characteristics of these systems is the use of a motherboard or system planar to electrically connect these components together. Examples of such personal computer systems are IBM's PC series, Aptiva series, and Intellistation series.

Some computer systems require a correct entry of a password prior to completing a boot process or prior to permitting full access to the system. However, all of these computer systems must first be powered-on, receiving full system power prior to prompting for entry of a password. Once the computer system is powered-on receiving full system power, the computer system then executes some portion of the initialization, or power-on-self-test (POST) which causes the prompting for an entry of the password.

Although these system are more secure then systems which do not require any password, these systems are still subject to unauthorized access. Once the computer system receives full power and before the password is entered, an unauthorized user may access the system.

One example is gaining control through an option card's BOOT ROM. SCSI cards contain boot ROMs that provide utilities to configure SCSI devices. This utility is available during the execution of POST and before the keyboard is locked with a password.

Therefore a need exists for a data processing system and method for controlling power supplied to the system such that a correct entry of a password is required prior to the system receiving full system power.

SUMMARY OF THE INVENTION

A data processing system and method are described for controlling power supplied to the system. The system includes an internal power supply for receiving energy from an external source and supplying the energy to the system. The energy is full system power and is required for the system to be fully operable. The system is initially powered-off such that the energy is not initially supplied to the system. A power-on password is established. The internal power supply supplies the energy to the system only in response to a correct entry of the power-on password, wherein the system is inoperable prior to the correct entry of the power-on password.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

Figure 1:
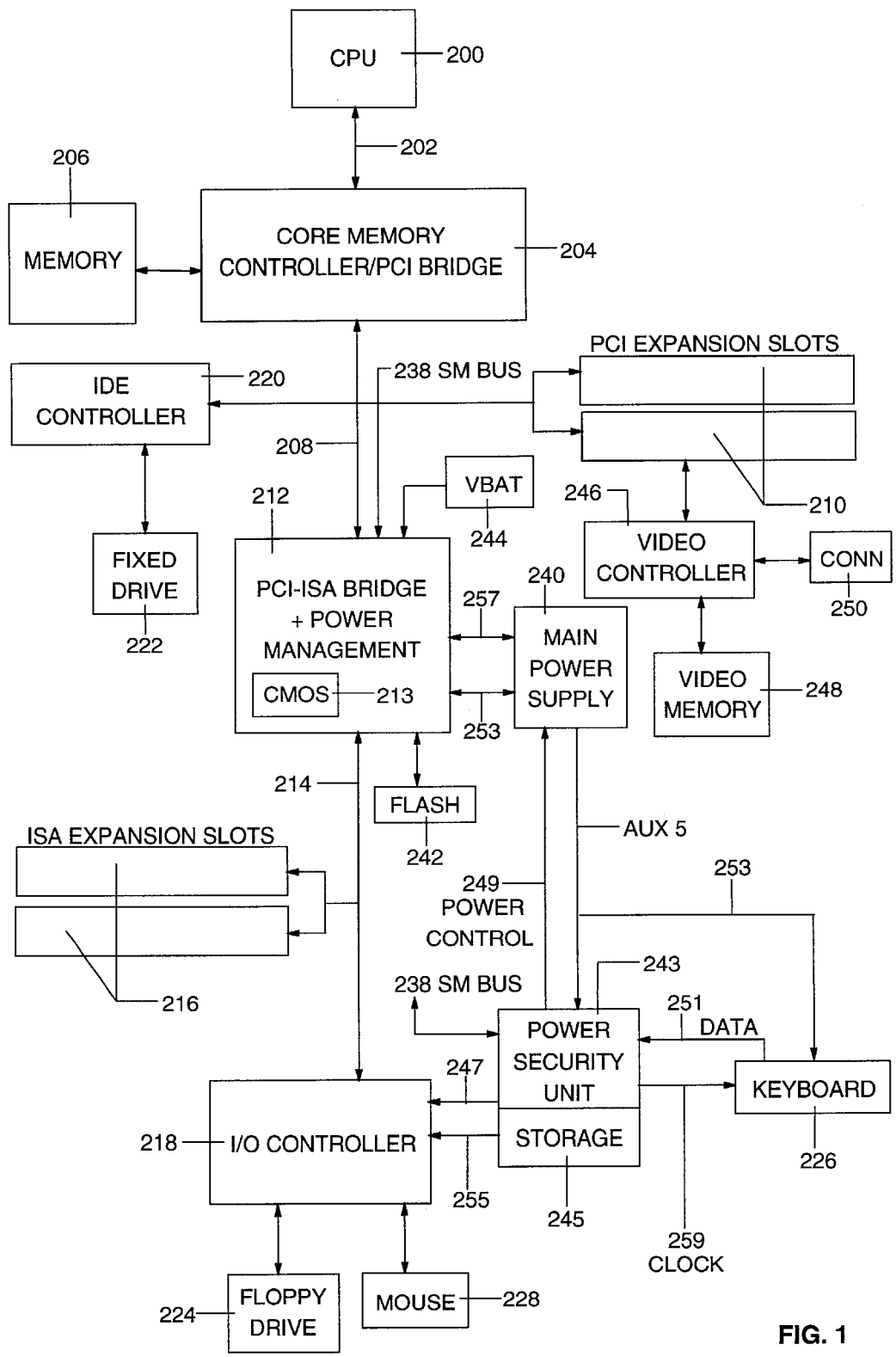
FIG. 1 depicts a pictorial representation of a client computer system including a power security unit in accordance with the method and system of the present invention.
Figure 2:
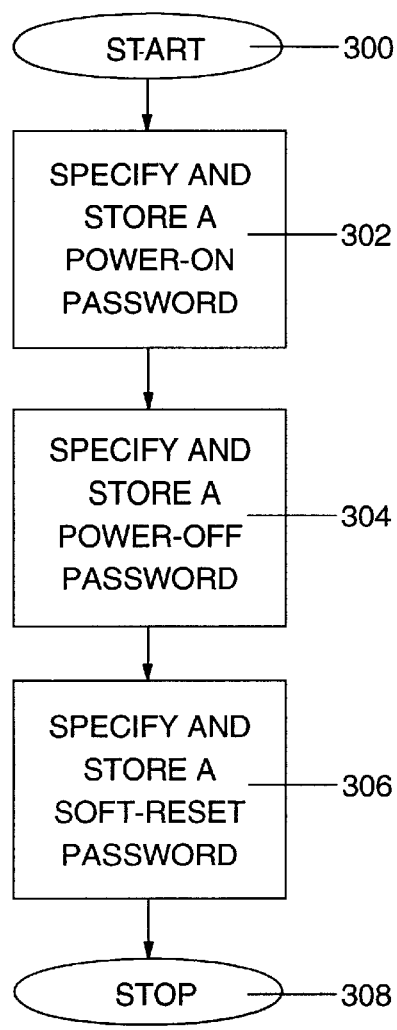
FIG. 2 illustrates a high level flow chart which depicts a specification and storage of power passwords for controlling power supplied to a data processing system in accordance with the method and system of the present invention.
Figure 3:
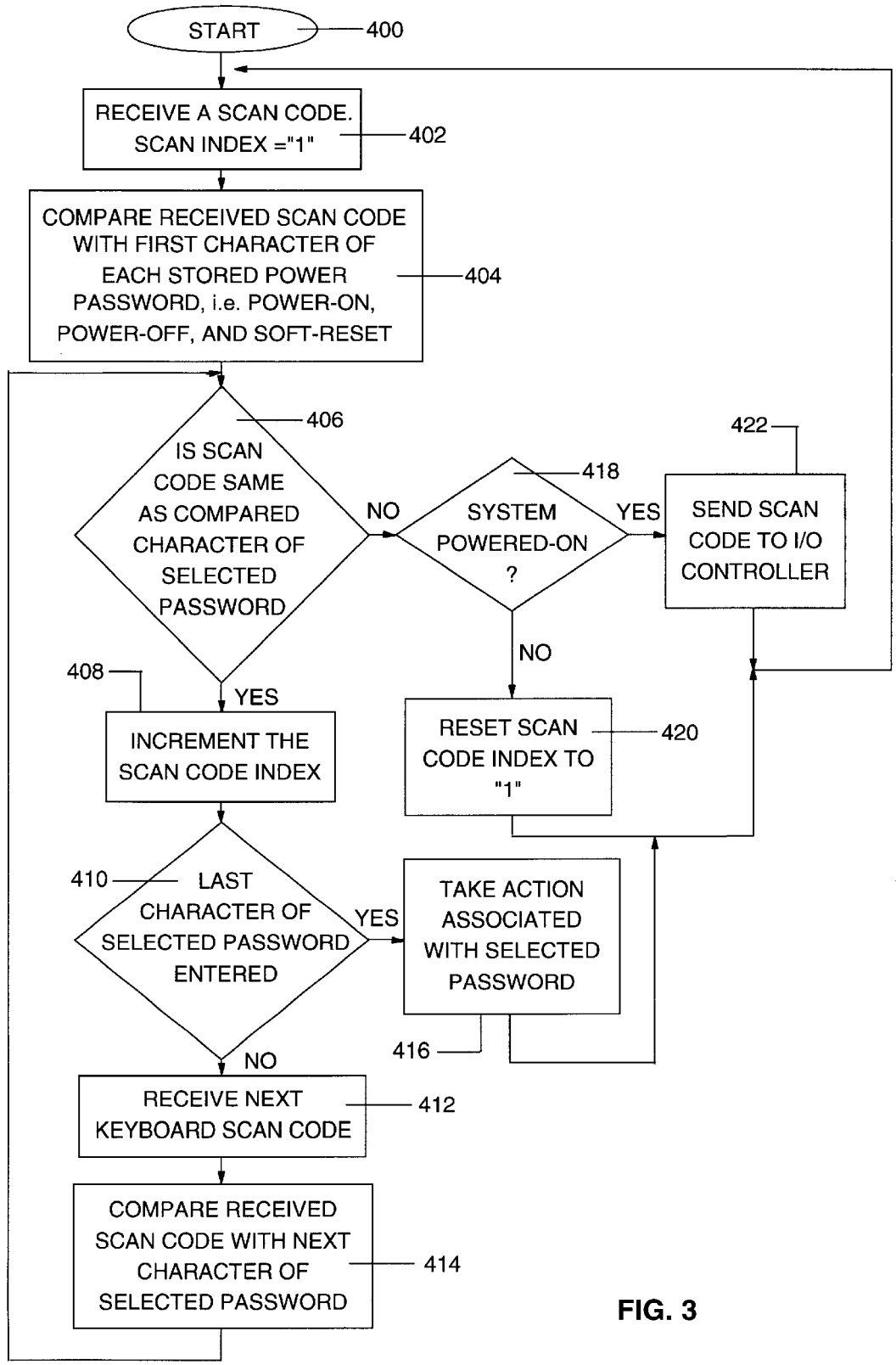
FIG. 3 depicts a high level flow chart which illustrates a supply of power to a data processing system being controlled in response to an entry of a power password in accordance with the method and system of the present invention.

A preferred embodiment of the present invention and its advantages are better understood by referring to FIGS. 1–3 of the drawings, like numerals being used for like and corresponding parts of the accompanying drawings.

The present invention is a method and system for controlling power supplied to the system, which is initially powered-off, such that a correct entry of a password is required prior to the system receiving full system power. A power security unit is included within the system between the keyboard and the keyboard controller. The power security unit (PSU) receives all inputs from the keyboard, and when appropriate, forwards them to the keyboard controller. The keyboard controller receives keyboard inputs only after the input has been analyzed and processed by the power security unit.

The system includes an internal power supply which receives energy from an external source. The internal power supply then supplies this energy as the full system power to the remaining components of the computer system. The energy is required to be supplied by the internal power supply prior to the system being fully operable. In the present invention, the computer system is initially powered-off, such that the power supply is not initially supplying energy to the components of the computer system. The power supply will not supply full system power until the power supply receives a power control signal from the PSU indicating that the power supply may begin supplying full system power.

The power security unit receives an auxiliary power from the power supply. The auxiliary power is not the full system power and is not capable of being supplied to the system such that the system would be fully operable. The auxiliary power is also supplied to the keyboard by the power supply unit.

All keyboard inputs are first received only by the power security unit. The keyboard inputs must first be analyzed by the PSU prior to the input being forwarded to the keyboard controller.

The PSU includes storage in which one or more passwords are stored. The PSU will include a power-on password stored in its storage.

While the computer system is powered-off, the PSU and the keyboard both receive auxiliary power. Therefore, when the system is off and a key is depressed, the scan code associated with that key will be forwarded from the keyboard to the PSU. The PSU will analyze all inputs to the keyboard while the computer system is powered-off.

When an input is received by the PSU from the keyboard and the computer system is initially powered-off, the PSU determines whether the input is the first character of the power-on password. If the PSU determines that the input is not the first character of the stored power-on password, the PSU will not cause the power supply to supply full power, and the PSU will not forward the input to the keyboard controller.

However, if the computer system is initially powered-off and the PSU determines that the input is the first character of the power-on password, the PSU waits for another input from the keyboard. Thereafter, the PSU determines if the power-on password was entered. If the power-on password was entered, the PSU will send a signal to the power supply causing it to begin supplying full system power.

While the computer system is powered-on, the PSU will receive each keyboard input. If the PSU determines that the power-off password or RESET password was entered, the PSU will send a signal to the power supply to either cause the power supply to cease supplying full system power or to cause the reset of the computer system.

While the computer system is powered-on, if the PSU determines that neither the power-off password nor the RESET password was entered, the PSU will forward the input to the keyboard controller for normal processing.

In this manner, the power-on password must be entered correctly prior to the computer system ever receiving full system power.

FIG. 1 depicts a pictorial representation of a client computer system including a power security unit in accordance with the method and system of the present invention. A central processing unit (CPU) 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 212 are connected to PCI bus bridge 204 utilizing PCI bus 208. IDE controller 220 provides for the attachment of IDE compatible storage devices such as fixed disk drive 222. PCI/ISA bridge 212 provides an interface between PCI bus 208 and an optional feature or expansion bus such as the ISA bus 214. PCI/ISA bridge 212 includes power management logic. A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

PCI-ISA bridge controller 212 includes an interface for a flash memory 242 which includes microcode which client 104 executes upon power-on. Flash memory 242 is an electrically erasable programmable read only memory (EEPROM) module and includes BIOS that is used to interface between the I/O devices and operating system. PCI-ISA bridge controller 212 also includes storage 213, which is preferably implemented utilizing CMOS storage, that holds the initialization, BIOS, settings. Storage 213 includes values which describe the present configuration of client 104. For example, storage 213 includes information describing the list of initial program load (IPL) devices set by a user and the sequence to be used for a particular power method, the type of display, the amount of memory, time date, etc. Furthermore, this data is stored in storage 213 whenever a special configuration program, such as configuration/setup is executed. PCI-ISA bridge controller 204 is supplied power from battery 244 to prevent loss of configuration data in storage 213.

Client system 104 includes a video controller 246 which may, for example, be plugged into one of connector slots 210. Video controller 246 is connected to video memory 248. The image in video memory 248 is read by controller 246 and displayed on a monitor (not shown) which is connected to client 104 through connector 250.

Client computer system 104 includes a power supply 240 which supplies full normal system power 257, and auxiliary power AUX 5 253. Auxiliary power 253 is not a Lull system power and is not sufficient to power system 104 so that it would be fully operable.

Auxiliary power 253 supplies full time auxiliary power to the power management logic 212, power security unit 243, and keyboard 226. This enables keyboard 226 to be constantly powered to process inputs. In addition, because PSU 243 is also constantly powered, PSU 243 will analyze and process each input to keyboard 226.

An I/O controller 218 is coupled to PCI-ISA bridge controller 212. I/O controller 218 controls communication between PCI-ISA bridge controller 212 and devices and peripherals such as floppy drive 224, keyboard 226 through power security unit 243, and mouse 228 so that these devices may communicate with CPU 200.

A power security unit (PSU) 243 is included and is coupled between keyboard 226 and I/O, or keyboard, controller 218. PSU 243 includes a storage 245 for storing a power-on password. Storage 245 may also be utilized for storing other power passwords such as a power-off password or RESET password. PSU 243 and keyboard 226 both receive auxiliary power signal AUX 5 253 from power supply 240 so that they are continuously powered.

PSU 243 receives keyboard inputs utilizing data signal line 251. PSU 243 outputs a keyboard clock utilizing clock signal line 259. PSU 243 sends all appropriate keyboard inputs to keyboard controller 218 utilizing signal line 255. PSU also provides a clock to I/O controller 218 utilizing signal line 247. PSU 243 may be controlled by software executing within client 104 utilizing SM bus 238.

When client 104 is powered-off and a key is depressed on keyboard 226, a scan code associated with the key is transmitted to PSU 243. PSU 243 then determines whether this scan code represents the first character of the stored power-on password. If the received scan code is not the first character of the power-on password, PSU 243 will not process the received scan code. PSU 243 will take no action, the scan code will not be forwarded to keyboard controller 218, and client 104 will remain powered-off.

If the scan code is the first character of the power-on password, PSU 243 will await the next keyboard input. If the next keyboard input is the second character, PSU 243 will await the third character. If PSU 243 receives a correct entry of the power-on password, PSU 243 will output a power control signal 249 to power supply 240. In response to the receipt of signal 249 by power supply 240, power supply 240 will then cause the output of full system power.

If client 104 is already powered on, PSU 243 will receive and analyze all inputs from keyboard 226. If an input is not the first character of the power-off or reset password, PSU 243 will send the input to keyboard controller 218 for normal processing. In this manner, all keyboard inputs first are received by PSU 243 prior to being received by keyboard controller 218.

FIG. 2 illustrates a high level flow chart which depicts a specification and storage of power passwords for controlling power supplied to a data processing system in accordance with the method and system of the present invention. The process starts as depicted by block 300 and thereafter passes to block 302 which illustrates a specification and storage of a power-on password. Next, block 304 depicts a specification and storage of a power-off password. Thereafter, block 306 illustrates a specification and storage of a soft-reset password. The process then terminates as depicted by block 308.

FIG. 3 depicts a high level flow chart which illustrates a supply of power to a data processing system being controlled in response to an entry of a power password in accordance with the method and system of the present invention. The process starts as depicted by block 400 and thereafter passes to block 402 which illustrates power security unit 243 receiving an input from keyboard 226 in the form of a scan code. The scan index is initially set equal to one. When the scan code index is set to one, power security unit 243 is awaiting the entry of the first character of one of the power passwords. Next, block 404 depicts power security unit 243 comparing the input scan code with the first character of each power password. Thereafter, block 406 illustrates a determination of whether or not the input scan code matches the first character of one of the stored power passwords. If a determination is made that the input scan does match the first character of one of the power passwords, the process passes to block 408. The password which included the matching first character is the selected password.

Block 408 depicts the incrementing of the scan code index. In this manner, power security unit 243 is awaiting the correct entry of the next character of the selected password. Next, block 410 illustrates a determination of whether or not the last character of the selected password has been entered. If a determination is made that the last character of the selected password has not been entered, the process passes to block 412 which depicts power security unit 243 receiving the next keyboard scan code. Thereafter, block 414 illustrates a comparison by power security unit 243 of the received scan code with the character of the selected password indicated by the scan code index. The process then passes back to block 406.

Referring again to block 410, if a determination is made that the last character of the selected password has been correctly entered, the process passes to block 416 which depicts taking the action associated with the selected password. If the selected password was the power-on password, power security unit 243 will transmit a signal 249 to power supply 240 to supply full system power 257 to the computer system 104. If the selected password was the power-off password, power security unit 243 will transmit a signal 249 to power supply 240 to cease supplying full system power to the computer system. And, If the selected password was the soft-reset password, power security unit 243 will transmit a signal 249 to power supply 240 to execute a soft-reset. The process then passes back to block 402.

Referring again to block 406, if a determination is made that the input scan code is not the same as the compared character of the selected password, the process passes to block 418 which depicts a determination of whether or not the computer system is currently powered-on, receiving full system power 257. If a determination is made that the computer system is not powered-on, the process passes to block 420 which illustrates the resetting of the scan code index equal to one. Therefore, if the computer system is powered off but does not receive a correct entry of the next character of the power-on password, the process passes back to block 402.

Referring again to block 418, if a determination is made that the computer system is powered-on, the process passes to block 422 which depicts the sending of the entered scan code to keyboard controller 218. The process then passes back to block 402. In this manner, if the system is powered on and receives a keyboard input which is not the next character of the soft-reset password or the power-off password, power security unit 243 will output that scan code to keyboard controller 218 to be utilized in a known manner.

While a preferred embodiment has been particularly shown and described, it will be understood by those skilled in the art that various changes in form and detail may be made therein without departing from the spirit and scope of the present invention.

What is claimed is:

1. A method in a data processing system for controlling power supplied to said system, said system including an internal power supply for receiving energy from an external source and supplying said energy to said system, said energy being full system power and being required for said system to be fully operable, said method comprising the steps of:

said system initially being powered-off, wherein said energy is not initially supplied to said system;

establishing a power security unit between a keyboard and a keyboard controller included within said system, said power security unit separating said keyboard from said keyboard controller so that said keyboard is not directly connected to said keyboard controller and all keyboard inputs are first received by said power security unit prior to being received by said keyboard controller;

establishing a power-on password within said power security unit;

said power security unit receiving a plurality of keyboard inputs;

said power security unit determining whether said plurality of keyboard inputs is said power-on password;

only in response to said power security unit determining that said plurality of keyboard inputs is said power-on password, said power security unit transmitting a power-on signal to said internal power supply; and in response to said power supply receiving said power-on signal, said power supply beginning a supply of said energy to said system.

2. The method according to claim 1, further comprising the steps of:

said system being powered-on;

establishing a power-off password within said power security unit;

said power security unit receiving a second plurality of keyboard inputs;

said power security unit determining whether said second plurality of keyboard inputs is said power-off password;

in response to said power security unit determining that said second plurality of keyboard inputs is said power-off password, said power security unit transmitting a power-off signal to said internal power supply; and in response to said power supply receiving said power-off signal, said power supply ceasing a supply of said energy to said system.

3. The method according to claim 2, further comprising the steps of:

said system being powered-on;

establishing a reset password within said power security unit;

a said power security unit receiving a third plurality of keyboard inputs;

said power security unit determining whether said third plurality of keyboard inputs is said reset password;

in response to said power security unit determining that said third plurality of keyboard inputs is said reset password, said power security unit transmitting a reset signal to said internal power supply; and in response to said power supply receiving said reset signal, said power supply causing said system to be reset.

4. The method according to claim 3, further comprising the step of in response to said power security unit determining that said second plurality of keyboard inputs is not said power-off password, said power security unit transmitting said second plurality of keyboard inputs to said keyboard controller.

5. A data processing system, comprising:

an internal power supply being capable of supplying energy from an external source to said data processing system only in response to a power-on signal, wherein said energy is full system power and said data processing system is not fully operable prior to supply of said energy;

a keyboard controller;

a power security unit interposed between a keyboard and said keyboard controller so that the keyboard is not directly connected to said keyboard controller and all keyboard inputs are first received by said power security unit prior to being received by said keyboard controller, wherein said power security unit, responsive to receipt of a plurality of keyboard inputs while the data processing system is powered-off, determines whether said plurality of keyboard inputs is said power-on password and, if so, transmits said power-on signal to said internal power supply so that said internal power supply will begin supplying energy to said data processing system.

6. The data processing system of claim 5 wherein:

said power security unit, responsive to receipt of a second plurality of keyboard inputs while said data processing system is powered-on, determines whether said third plurality of said plurality of keyboard inputs is a power-off password and, if so, transmits a power-off signal to said internal power supply; and said power supply, responsive to said power-off signal, ceases to supply said energy to said data processing system.

7. The data processing system according to claim 6, wherein:

said power security unit, responsive to receipt of a third plurality of keyboard inputs while said data processing system is powered-on, determines whether said third plurality of keyboard inputs is a reset password and, if so, transmits a reset signal to said internal power supply; and said internal power supply, responsive to said reset signal, resets said data processing system.

8. The system according to claim 7, wherein said power security unit is configured to transmit said second plurality of keyboard inputs to said keyboard controller in response to a determination that said second plurality of keyboard inputs is not said power-off password.

* * * * *